United States Patent
Limper et al.

(10) Patent No.: US 7,556,420 B2
(45) Date of Patent: Jul. 7, 2009

(54) INTERNAL MIXER FOR KNEADING PLASTIC MATERIALS

(75) Inventors: Andreas Limper, Freudenberg (DE); Harald Keuter, Hamburg (DE); Maik Rinker, Gummersbach (DE); Dieter Berkemeier, Steinebach/Sieg (DE)

(73) Assignee: Harburg-Freudenberger Maschinenbau GmbH, Hamburg (DE)

( * ) Notice: Subject to any disclaimer, the term of this patent is extended or adjusted under 35 U.S.C. 154(b) by 393 days.

(21) Appl. No.: 11/254,244

(22) Filed: Oct. 19, 2005

(65) Prior Publication Data

US 2006/0098527 A1 May 11, 2006

(30) Foreign Application Priority Data

Oct. 19, 2004 (DE) .................. 10 2004 051 063

(51) Int. Cl.
*B29B 7/18* (2006.01)

(52) U.S. Cl. ............... 366/84; 366/97; 366/300; 366/76.7

(58) Field of Classification Search .......... 366/97, 366/83, 84, 297, 300, 76.7; 425/207, 208, 425/209
See application file for complete search history.

(56) References Cited

U.S. PATENT DOCUMENTS

| | | | | |
|---|---|---|---|---|
| 4,284,358 A * | 8/1981 | Sato et al. | ..................... | 366/97 |
| 4,300,838 A * | 11/1981 | Sato et al. | ..................... | 366/84 |
| 4,456,381 A * | 6/1984 | Inoue et al. | ..................... | 366/97 |
| 4,714,350 A * | 12/1987 | Nortey | ..................... | 366/84 |
| 4,718,771 A * | 1/1988 | Asai et al. | ..................... | 366/97 |
| 4,744,668 A * | 5/1988 | Nortey | ..................... | 366/76.7 |
| 4,830,506 A * | 5/1989 | Borzenski | ..................... | 366/76.2 |
| 4,834,543 A * | 5/1989 | Nortey | ..................... | 366/97 |
| 4,859,074 A * | 8/1989 | Asai et al. | ..................... | 366/97 |
| 4,914,635 A * | 4/1990 | Nishigai et al. | ..................... | 366/97 |
| 5,460,445 A * | 10/1995 | Miyoshi et al. | ..................... | 366/76.7 |
| 5,520,455 A * | 5/1996 | Yamada et al. | ..................... | 366/97 |
| 5,984,516 A * | 11/1999 | Inoue et al. | ..................... | 366/97 |
| 6,811,295 B2 * | 11/2004 | Koro et al. | ..................... | 366/97 |
| 6,913,379 B2 * | 7/2005 | Otsuka et al. | ..................... | 366/76.7 |

(Continued)

FOREIGN PATENT DOCUMENTS

EP 0 264 224 4/1988

(Continued)

OTHER PUBLICATIONS

Search report of EP 05019732, Mar. 29, 2006, 1 page.*

*Primary Examiner*—Tony G Soohoo
(74) *Attorney, Agent, or Firm*—Friedrich Kueffner

(57) ABSTRACT

An internal mixer for kneading plastic materials, particularly synthetic materials, caoutchouc or rubber mixtures includes a housing with a mixing chamber, two rotors which are driveable in opposite directions and are arranged in the mixing chamber with parallel axes. The rotors have non-meshing rotor bodies, wherein each rotor body has four helically mixing wings which at one end thereof define a front passage to the corresponding front wall of the housing. Each rotor body has for helically extending mixing wings which are successively oppositely arranged on the circumference, wherein the mixing wings extend at least over half the axial length of the mixing chamber, and wherein the mixing wings define at one end thereof a front passage to the corresponding front wall of the housing.

10 Claims, 3 Drawing Sheets

U.S. PATENT DOCUMENTS

| | | | |
|---|---|---|---|
| 2001/0050880 A1 * | 12/2001 | Regalia | 366/84 |
| 2006/0098527 A1 * | 5/2006 | Limper et al. | 366/97 |
| 2006/0104154 A1 * | 5/2006 | Inoue et al. | 366/96 |

FOREIGN PATENT DOCUMENTS

| | | | |
|---|---|---|---|
| EP | 1649 995 | * | 10/2005 |
| JP | 63-125307 | * | 5/1988 |
| JP | 9-313916 | * | 12/1997 |
| JP | 11-188249 | * | 7/1999 |
| JP | 2006-116400 | * | 5/2006 |

* cited by examiner

INTERNAL MIXER FOR KNEADING PLASTIC MATERIALS

BACKGROUND OF THE INVENTION

1. Field of the Invention

The present invention relates to an internal mixer for kneading plastic materials, particularly synthetic materials, caoutchouc or rubber mixtures. The mixer includes a housing with a mixing chamber, two rotors which are driveable in opposite directions and are arranged in the mixing chamber with parallel axes. The rotors have non-meshing rotor bodies, wherein each rotor bodies has four helically extending mixing wings which at one end thereof define a front passage to the corresponding front wall of the housing.

2. Description of the Related Art

In an internal mixer, as it is known, for example, from EP 0 264 224 B1, each rotor body has two long wings and two short wings, wherein the long mixing wings extend over at least half the axial length of the mixing chamber and end at the discharge end thereof at the corresponding end face of the rotor bodies, while the long mixing wings are defined at their discharge ends by passages which have the appropriate width and extend to the respective front wall of the housing. The angle of inclination of the mixing wings, i.e., the angle of the mixing wings with the tangent of the rotor bodies, is about 60° to 70°.

In this internal mixer which is known as a rubber kneader, the energy introduction into the material to be mixed, i.e., predominantly caoutchouc mixtures, is good.

When mixing caoutchouc, a distinction is made between dispersive mixing and distributive mixing. Dispersive mixing is the comminution of mixture components, for example, soot agglomerates. Distributive mixing is the macroscopic homogenizing of the mixture components within the mixing chamber.

The basic principle of the internal mixer, for example, described in EP 0 264 224 B1, is the fact that the caoutchouc mixture to be mixed is intensively mixed within a bulge forming in front of the active side of the long mixing wings and, due to the angle of the helix, i.e., the angle of the mixing wings relative to the axis of the rotor, and due to the rotation of the rotor bodies, the material is transported axially until it reaches the passage at the free front end in axial direction.

As tests carried out by the applicant have shown, depending on the mixture only a small quantity of the caoutchouc mixture relative to the total mixture located in the mixing chamber travels through the gap between the mixing wing tips on the rotor bodies and the mixing chamber wall. It is possible to conclude from this that the dispersive mixing effect essentially results from the movement of the caoutchouc mixture in front of the active side of the long mixing wings.

As disclosed in EP 0 264 224. B1, after the caoutchouc mixture passes through the free passage at the end face, the mixture is deflected axially by the subsequent short wings, so that the caoutchouc mixture is supplied to the next following long mixing wing, where the mixing process is repeated in front of the active side. At this stage, the material once again predominantly flows axially along the long mixing wings and simultaneously is moved, rotationally within a bead. In the middle of the mixing chamber, where the rotor bodies move past each other in a tangential direction, the caoutchouc mixture is transferred or exchanged from one mixing chamber half into the other mixing chamber half. The flow process of the material in one mixing chamber half as well as the material exchange between the rotor bodies results in an effective distributive mixing effect.

Consequently, the dispersive mixing effect of a rotor body depends predominantly on the number of the long mixing wings which are available, the shape of the mixing wing geometry, the configuration of the three passages at the front end, the geometric arrangement of the mixing wings on the rotor bodies, and various method-related operating parameters of the internal mixer, such as, for example, filling factor, rate of rotation, etc. These factors continue to determine the quantity of the energy which can be introduced into the material being mixed with respect to a given mixing period. It is generally known that dispersive mixing effect and energy introduction correlate. With increasing energy introduction into a material being mixed the dispersive mixing effect and, thus, the quality of the manufactured caoutchouc mixture, are increased. The dispersive mixing effects of rotor bodies and, thus, the energy which can be introduced into the caoutchouc or rubber substance is not of particular importance for the manufacture of basic mixtures which do not yet contain or do not yet contain all cross-linking chemicals.

The distributive mixing effect of a rotor body also depends predominantly on the number of available long and short wings. With increasing number of mixing wings on a rotor body, the caoutchouc mixture is increasingly divided into smaller portions and is axially deflected. Moreover, inter alia, the arrangement of the mixing wings, the angle of the helix, the configuration of the free passages at the front end, possibly also at both ends and the selection of the process-related operating parameters are of great significance with respect to the distributive mixing effect.

SUMMARY OF THE INVENTION

It is the primary object of the present invention to improve the above-described mixer with respect to its rotor geometry in such a way that the dispersive mixing effect and, thus, the energy introduction and the mixing quality are decisively increased while simultaneously a good distributive mixing effect is achieved.

In accordance with the present invention, each rotor body has four helically extending mixing wings which are successively oppositely arranged on the circumference, wherein the mixing wings extend at least over half the axial length of the mixing chamber, and wherein the mixing wings define at one end thereof a front passage to the corresponding front wall of the housing.

As a result of the fact that each of the two rotor bodies has four long mixing wings, the caoutchouc or rubber material to be mixed is divided into four portions per rotor body, wherein an intensive dispersive mixing effect is achieved on the active side of the respective mixing wing. The total length of all mixing wings per rotor is significantly increased as compared to the known rotor bodies which results in a correspondingly higher introduction of energy into the mixture.

In accordance with an advantageous feature., the mixing wings have at the circumference of the rotor body the same shape, dimensions, and position.

It has been found advantageous if in each mixing wing on the rotor body, the ratio of the axial length (l) of the front passage to the axial length (L) of the mixing chamber is $0.2 \geq l/L < 0.5$.

In accordance with another advantageous feature, the mixing wings may have the same shape and/or length.

A good mixing effect is achieved if the angle of the helix of the mixing wings is at least 20°, preferably in the range between 20° and 35°, wherein the mixing wings may have the same helix angle.

Another advantageous feature provides that the mixing wings have at least two sections, wherein the helix angle in the first section is greater than in the second section. The respective helix angles (α) may be 40° to 50°, preferably 45°, in the first section and 20° to 30°, preferably 26°, in the second section.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
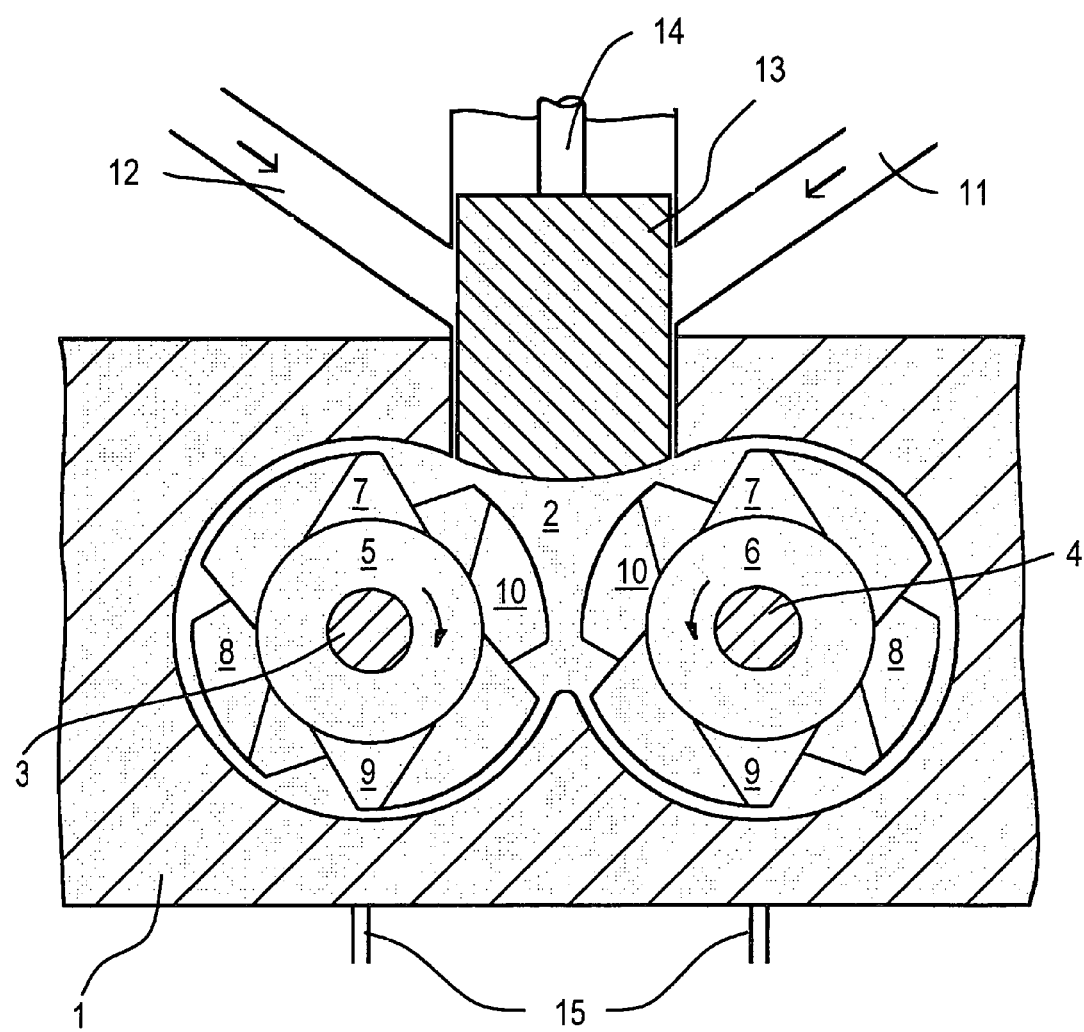
FIG. 1 is a sectional view of an internal mixer according to the present invention.

FIG. 1 schematically illustrates the basic configuration of the internal mixer according to the present invention with a housing 1. Arranged in the housing 1 is a mixing chamber 2 which has the shape of two horizontally extending cylinders which are arranged next to each other and which contact each other or intersect each other over a certain extent. Arranged in the mixing chamber 2 are two shafts 3 and 4 with rotor bodies 5 and 6, wherein the shafts 3 and 4 extend concentrically with the cylinders of the mixing chamber 2. Mixing wings 7 to 10 are arranged on the cylinders.

The mixing wings 7 to 10 extend over more than half the axial length L of the rotor bodies 5 and 6 and, thus, of the mixing chamber 2, as will be explained in more detail in connection with FIGS. 2 and 3. At their discharge ends, two of the mixing rings 7 to 10 each end at the corresponding front end of the rotor bodies 5 and 6, while at the discharge ends correspondingly wide front passages are defined through the respective front wall of the housing 1. The two other mixing wings have the passages to the respective front wall of the housing 1 at the discharge ends.

Mixing material, for example, polymer and/or chemicals, can be supplied to the mixing chamber 2 through a first intake 11, and mixing additives, for example, soot and/or chalk, can be supplied to a second intake 12, or in a similar manner. These materials to be mixed are subjected to pressure by means of a die 13 by means of a piston rod 14 and a hydraulic work cylinder, not shown.

The outlet for the mixed material is generally known in the art and does not require illustration. For clarity's sake, any cooling ducts required for supplying cooling medium from the outside through lines 15 are not shown.

Figure 2:
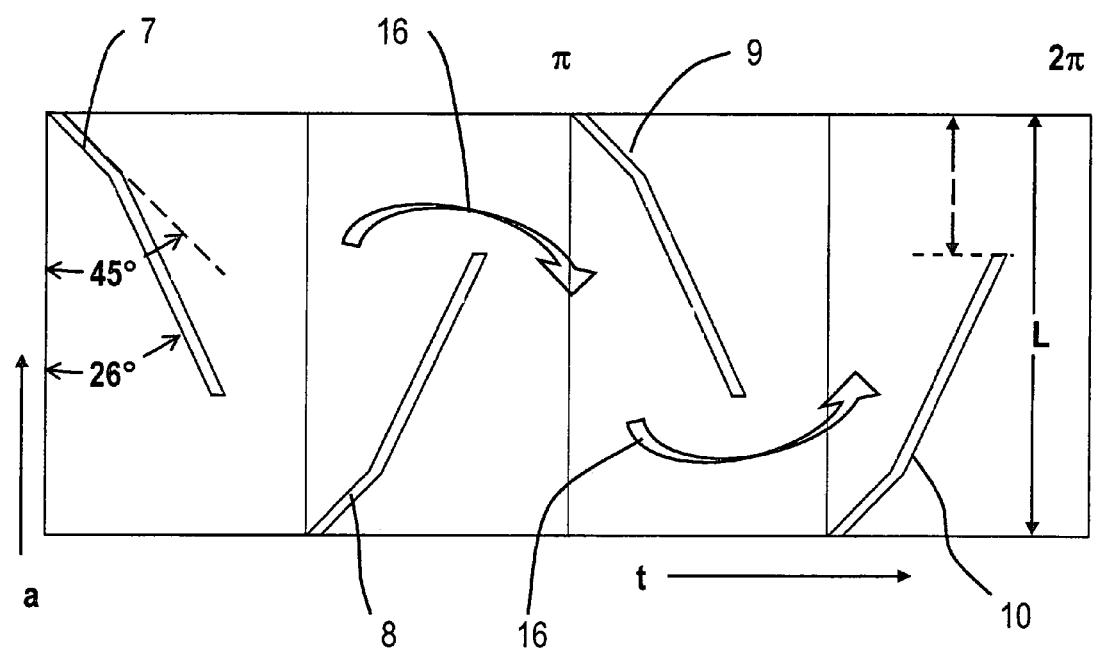
FIG. 2 is a developed view of a rotor body of the-internal mixture of FIG. 1.

FIG. 2 shows a complete development 2π along the tangential direction t of a rotor body 5 of the internal mixture according to FIG. 1. The drawing only shows the apex of each mixing wing 7 to 10. The first mixing wing 7 begins at 0° on one side of the rotor body 5 and protrudes toward the middle thereof. The second mixing ring 8 begins at 90°±10° on the other side of the rotor body 5 and is aligned in the completely opposite direction. The distances of the following mixing wings 9 and 10 and the orientations thereof are the same.

The mixing wings 7 to 10 define in a first section with the axial direction a a first helix angle a of, for example, 45°. In an adjacent second section, the helix angle α is only, for example, 26°.

The mixing wings 7 to 10 extend at least over half the axial length of the mixing chamber and end at their discharge ends at the corresponding front end of the rotor bodies 5 and 6, while the wings define at their downstream ends correspondingly wide front passages to the corresponding front wall of the housing.

The length of the mixing wings 7 to 10 is greater than 50% to 80% of the axial length of the rotor bodies 5 and 6.

Flow arrows 16 show the pattern of the mixed material in the area of the front passages between the ends of the mixing wings 8 and 9 and the corresponding end walls of the mixing chamber 2 if the rotary movement of the rotor bodies 5 and 6, as shown in FIG. 1, extends against the tangential direction t.

Figure 3:
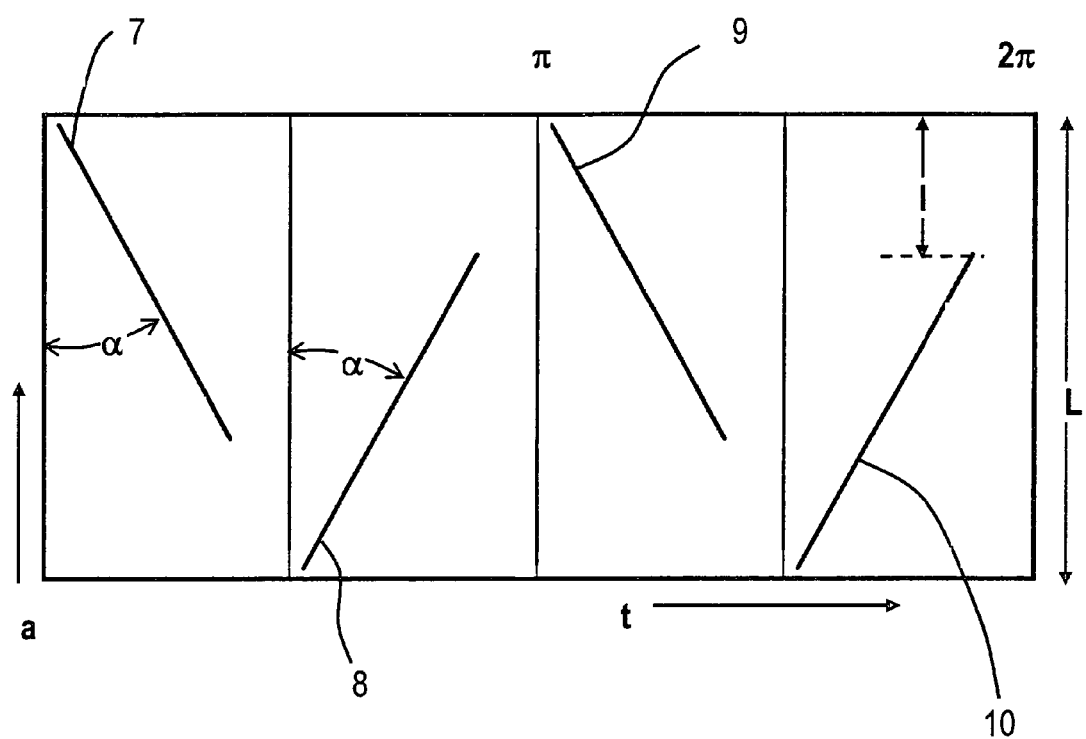
FIG. 3 is a developed view of another embodiment according to the present invention of a rotor body of the internal mixer of FIG. 1.

FIG. 3 shows another developed view 2π along the tangential direction t of another embodiment of a rotor body 5 of the internal mixer according to FIG. 1. The mixing rings 7 to 10 include with the axial direction a a helix angle α which, in accordance with the present invention should be α≧20°. In the illustrated embodiment, the angle is about 30°. The length L of the rotor body 5, 6 corresponds essentially to the length L of the mixing chamber 2. The mixing wings 7 to 10 on the rotor bodies 5, 6 each have a length in the axial direction which is greater than half the axial length L of the mixing chamber. This means that the ratio l/L of the distance l from the mixing wings 7 to 10 and the corresponding front end to the axial length L of the mixing chamber is 0.2≦l/L<0.5.

Because of the four mixing wings 7 to 10 which are of similar configuration and have similar lengths, and similar helix angles a, the caoutchouc or rubber substance to be mixed is divided into four portions per rotor body. In front of the active side of the respective long mixing wings 7 to 10, the caoutchouc mixture to be mixed is intensively mixed within a bead and, due to the helix angle and the rotation of the rotor bodies, the mixture is transported axially until it reaches the free front passage, so that an intensive dispersive mixing effect is achieved. Consequently, the total length of the mixing rings 7 to 10 is significantly increased as compared to known rotor bodies, which results in a correspondingly higher energy introduction into the mixture.

After the caoutchouc mixture has passed through the free front passage, the mixture reaches the next long mixing ring 7 to 10, the mixing process in front of the active side is repeated, i.e., the material once again flows axially predominantly along the long mixing wings 7 to 10 and the material is uniformly rotationally moved within a bead. In the middle of the mixing chamber 2, where the rotor bodies move tangentially past each other, the caoutchouc mixture is transferred or exchanged from one mixing chamber half into the other. An effective distributive mixing effect is achieved because of the flow process of the material in a mixing chamber half and because of the material exchange between the rotor bodies.

As compared to the known internal mixers, due to the rotor body geometry of the mixing rings 7 to 10 of the internal mixer according to the present invention, the dispersive mixing effect and, thus, the energy introduction as well as the mixing quality with a simultaneously distributive mixing effect are significantly increased.

While specific embodiments of the invention have been shown and described in detail to illustrate the inventive principles, it will be understood that the invention may be embodied otherwise without departing from such principles.

We claim:

1. An internal mixer for kneading plastic materials, particularly synthetic materials, caoutchouc or rubber mixtures, the internal mixer comprising a housing with a mixing chamber, two rotors driven in opposite directions, wherein the rotors are arranged in the mixing chamber with parallel axes, wherein the rotors each have non-meshing rotor bodies, wherein each rotor body has a plurality of mixing wings arranged helically on a circumference of the rotor body and successively in opposite directions, wherein all the mixing wings extend at least along half the axial length of the mixing chamber, and wherein the mixing wings define at one end thereof a front passage to a corresponding end wall of the housing, wherein each rotor body has four mixing wings.

2. The internal mixer according to claim 1, wherein the mixing wings have the same shape, dimension, and position at the circumference of the rotor bodies.

3. The internal mixer according to claim 1, wherein in each mixing wing, a ratio of the axial length (1) of a front passage to the axial length (L) of the mixing chamber is $0.2 \leq 1/L < 0.5$.

4. The internal mixer according to claim 3, wherein the mixing wings have equal lengths.

5. The internal mixer according to claim 3, wherein the mixing wings have the same shape.

6. The internal mixer according to claim 1, wherein a helix angle of the mixing wings with the axial direction of the rotor bodies is between 20° and 35°.

7. The internal mixer according to claim 6, wherein the mixing wings each have the same helix angle.

8. The internal mixer according to claim 6, wherein each mixing wing has two sections, wherein the helix angle in a first section is greater than in a second section.

9. The internal mixer according to claim 8, wherein the helix angle in the first section is 40° to 50° and 20° to 30° in the second section.

10. The internal mixer according to claim 8, wherein the helix angle in the first section is 45° and 26° in the second section.

* * * * *